United States Patent [19]

Harnois

[11] 4,231,201
[45] Nov. 4, 1980

[54] METHOD AND DEVICE FOR ARRANGING A STORAGE AREA

[76] Inventor: Georges A. Harnois, 22, rue des Paquerettes, 91540-Mennecy, France

[21] Appl. No.: 943,970

[22] Filed: Sep. 20, 1978

[30] Foreign Application Priority Data

Nov. 10, 1977 [FR] France .......................... 77,33887

[51] Int. Cl.³ .............................................. E04F 11/00
[52] U.S. Cl. ...................................... 52/169.6; 52/20; 52/187; 52/742
[58] Field of Search .............. 52/135, 136, 137, 169.6, 52/169.14, 169.13, 169.1, 176, 187, 742, 20

[56] References Cited

U.S. PATENT DOCUMENTS

| | | | |
|---|---|---|---|
| 3,287,865 | 11/1966 | Lockman | 52/136 |
| 3,293,865 | 12/1966 | Loffbourow | 52/169.6 |
| 3,358,407 | 12/1967 | Konig | 52/79.4 |
| 3,728,464 | 4/1973 | Griffing | 52/20 |
| 4,136,493 | 1/1979 | Bradford | 52/169.7 |

FOREIGN PATENT DOCUMENTS

| | | | |
|---|---|---|---|
| 860202 | 1/1941 | France | 52/169.6 |
| 1149379 | 12/1957 | France | 52/169.7 |
| 194789 | 12/1937 | Switzerland | 52/169.6 |

*Primary Examiner*—John E. Murtagh
*Attorney, Agent, or Firm*—Fisher, Christen & Sabol

[57] ABSTRACT

The invention relates to a method and device for arranging a storage area in a construction comprising a generally concrete layer in the form of a flagstone, by which it rests on the ground, wherein an opening is cut out in said layer, through which a well is bored in the ground, after which a prefabricated element defining said storage area is disposed in said well. The invention is more particularly applicable to the production of storage areas in constructions not comprising any.

11 Claims, 8 Drawing Figures

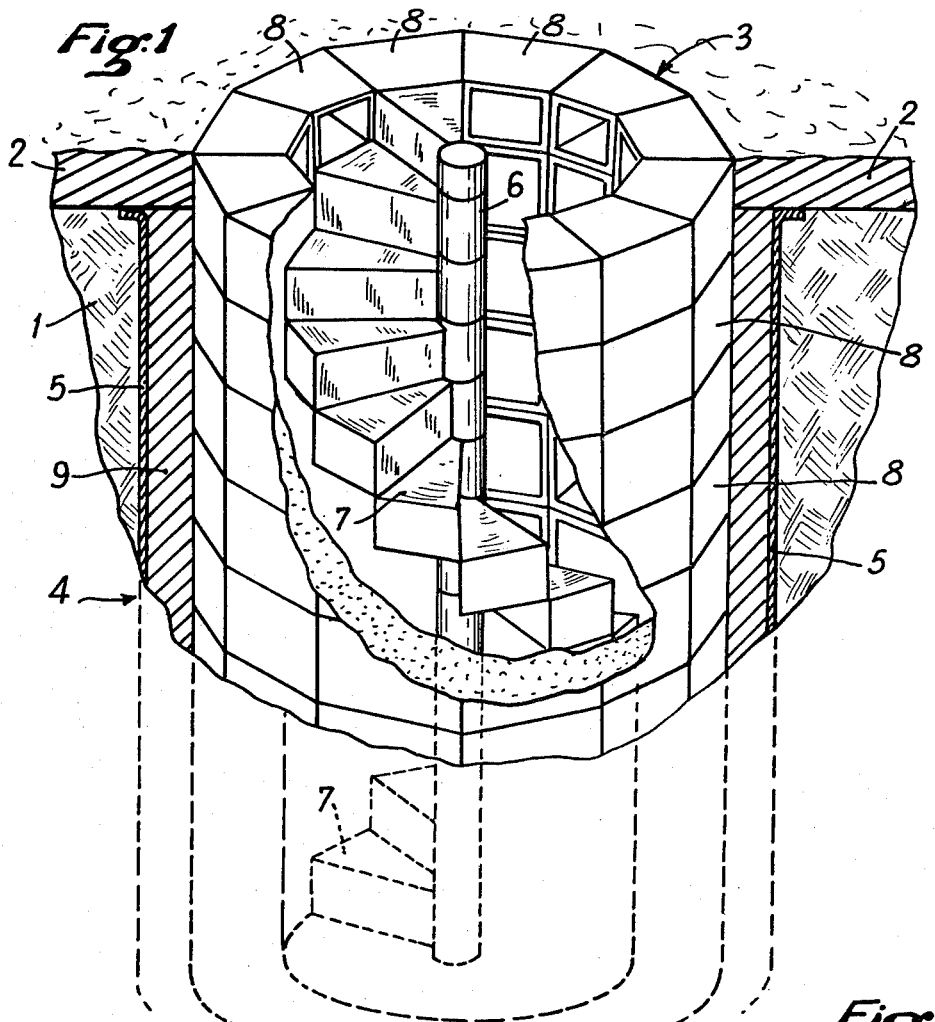
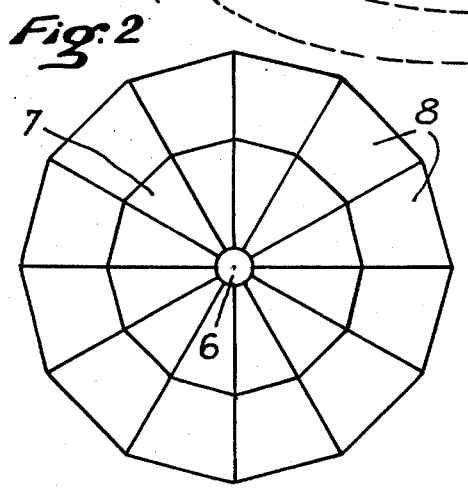
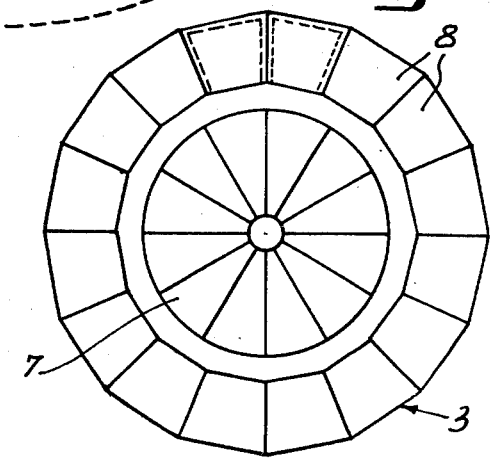

METHOD AND DEVICE FOR ARRANGING A STORAGE AREA

The present invention relates to a method and device for arranging a storage area, particularly for food or pharmaceutical products.

It is known that certain food products such as for example wine, fruit, vegetables or pharmaceutical products or other products which may be damaged under the action of light, heat or considerable variations in humidity, must be stored away from the heat and at a substantially constant degree of hygrometry.

To this end, it is therefore necessary to have suitable premises, such as cellars. However, the majority of modern individual houses constructed according to industrial or semi-industrial methods, and certain shops, do not at the present time have cellars which were conventionally used for storing this type of products. The present solutions in this case consist either in using ice boxes with controlled humidity, or, when there is a garden adjoining the house, in generally making a construction of the store-room type at the bottom of the garden, often partly sunken.

The first of these solutions involves a high cost of construction and is relatively expensive to maintain in view of the necessary consumption of energy. Furthermore, the storage volume is relatively small. The second of these solutions also involves a relatively high investment for its construction and, apart from its often highly inaesthetic appearance in the garden, has the drawback, due to the at least partial exposure to the sun and to bad weather, of not conserving the stored products under the desired conditions of temperature and humidity.

It is an object of the present invention to provide the arrangement of premises for storing products such as food or pharmaceutical products, away from the heat, in simple manner, with low installation costs, and requiring virtually no costs for maintenance after installation, in constructions not provided with such premises.

To this end, according to the invention, the method for arranging a storage area in a construction comprising a generally concrete layer in the form of a flagstone, by which it rests on the ground, is noteworthy by the steps of cutting an opening in said concrete layer, through which a well is bored in the ground, after which a prefabricated envelope is disposed in said well, said envelope defining said storage area.

Thus, said envelope being disposed in the ground, it benefits from the conditions of temperature and hygrometry of cellars.

The opening cut out in the concrete layer of the construction is preferably circular. In this way, said layer may be cut out and digging may be effected beneath the construction, without any risk of cracking of said layer.

Before the prefabricated envelope is placed in position, a damp-proof system may advantageously be disposed in said well, to form a sort of pocket insulated from the surrounding earth and containing said envelope. An earth thrust stabiliser may also be disposed between the dramp-proof system and the wall of the envelope.

For positioning said envelope, it is advantageous if it is constituted by a plurality of prefabricated elements which are superposed and/or juxtaposed.

In an advantageous embodiment, the elements of the envelope form cellular, for example modular bins, disposed in stacked rows over at least a part of the height of the well, whilst other elements form a member disposed at the centre of said envelope, allowing access to all the bins.

The elements forming the member giving access may be distinct from or fast with the elements forming bins.

The shape of the well bored in the ground of the construction through the opening may be of any type depending on the availability of space, but is very advantageously cylindrical, circular, especially when said opening is also circular.

The member giving access to the cellular bins, disposed at the centre of the well, is preferably a spiral staircase of which the central vertical newel is disposed along the vertical axis of the well from its bottom up to at least the level of the ground in which said well is bored.

In a particular embodiment, each bin is substantially parallelepipedic in form, the rear face of which has a shape adapted to the shape of the wall of the well.

In the embodiment in which the well is cylindrical in shape, particularly of circular section, the rows of bins extend against the wall of the well in an annular cylinder, each of the bins presenting, in horizontal section, the shape of an annular sector, i.e. it presents an upper horizontal wall, two flat vertical side faces convergent towards the centre of the well, a front face giving access, possibly a rear face each having the section of an arc of circle, the length of the arc of the front face being shorter than the length of the arc of the rear face.

It is obvious that other shapes may be provided for the bins without departing from the scope of the invention, particularly to adapt them to the particular shape of the well or to the particular storage requirements.

In a particular embodiment, the bins in two successive horizontal rows are aligned vertically. As a variant, the bins in two successive horizontal rows are staggered. Moreover the bins may or may not present a lower bottom wall and, if not, the bottom of each of the bins, after the device has been placed in position, is constituted by the upper outer face of the bin in the row located therebelow or of the parts of two bins of the lower row when said bins are staggered.

The elements may be made of any suitable material, particularly damp proof concrete or plastics material. These elements may advantageously be modular and made by casting, this allowing mass production which further reduces the cost of the installation of the device.

The invention will be more readily understood on reading the following description with reference to the accompanying drawings, in which:

FIG. 1 is a view in perspective, with parts torn away, of a device according to the invention placed in position in the ground of a construction.

FIG. 2 is a plan view of the device of FIG. 1.

FIG. 3 is a plan view of the device of FIG. 1, in a variant embodiment.

Figure 6:
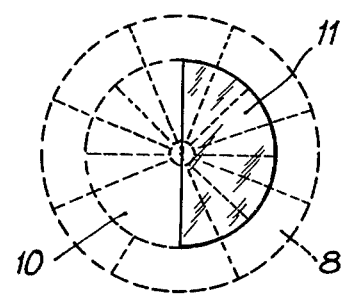
Figure 7:
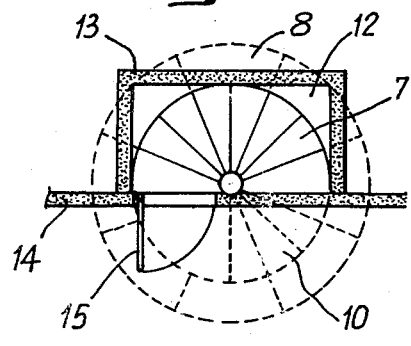
Figure 8:
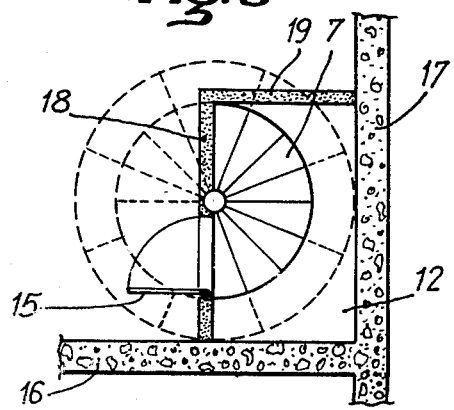

FIGS. 6, 7 and 8 schematically illustrate, in plan view, three possible implantations of the device according to the invention.

To make, according to the invention, a storage area in a construction (not shown) resting on the ground 1 via a cement layer 2, one begins by cutting out an opening 3, preferably circular, in said layer.

Then, through the opening 3, a well 4, for example cylindrical, is bored in the ground 1. Such a well may be 2.80 m deep with a diameter of 1.80 m, in the case of an individual house.

The walls of the well 4 are coated with a damp-proof system 5, for example in the form of a sheet of synthetic material, such as butyl.

Inside the well 4 and at its centre, a spiral staircase is then arranged, for example composed of prefabricated concrete elements, the central newel 6 of which is disposed axially and vertical at the centre of the well and the steps 7 of which extend from the bottom of the well to its upper opening.

A plurality of horizontal rows of cellular bins 8 each having a depth of for example about 25 cm, are then stacked over a part of the height of the well from its bottom, or preferably over the whole height thereof, and along part of its perimeter, or preferably over the whole thereof.

These bins 8, advantageously made of cast damp-proofed concrete are positioned in the well in the manner of parpens and thus cover the surface of the wall of said well, forming a large number of separate spaces for storage, adapted to receive various products to be stored, such as in particular bottles, fruit and vegetables or pharmaceutical products. It is possible to define, as a function of the depth in the well, different storage zones each suitable for a type of product.

The bins in the embodiment shown are disposed in an annular cylinder of which the outer wall corresponds to the wall of the well and the inner wall comprises a plurality of cells presenting a front face giving access.

The bins may be directly juxtaposed as in the example shown or a space may be made between each of the bins of the same row.

Figure 4:
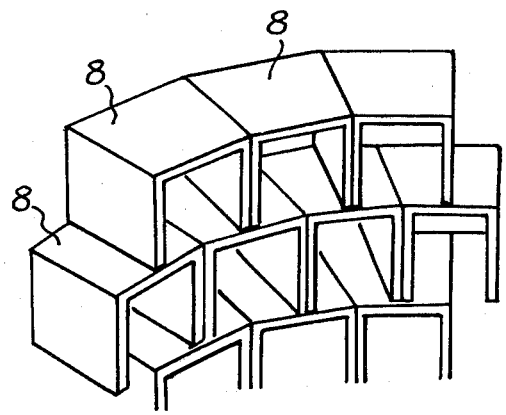
FIG. 4 shows a variant arrangement of cellular bins of the device according to the invention.

Moreover, the bins may be arranged in vertically aligned rows, as in the example of FIG. 1, or staggered as in the example FIG. 4.

As illustrated in FIG. 3, the elements 8 forming the bins may be separate from the elements 7 forming staircase. On the other hand, as illustrated in FIG. 2, each step 7 of the staircase may form an integral part with one or several bin elements 8.

In the example of FIG. 4, the bins have been shown without lower bottom wall, each of the bins resting on the upper faces of two bins of the lower row. Such an embodiment, without bottom face of each of the bins, makes it possible on the one hand to make a saving of material when the bins are cast and on the other hand to facilitate the operation of demoulding the bins during manufacture.

Figure 5:
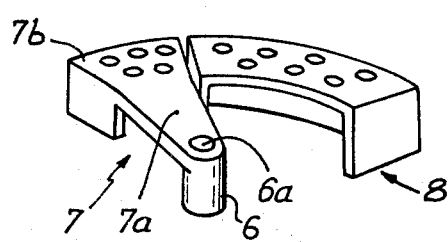
FIG. 5 illustrates, in perspective, and side by side, a step element and a bin element.

In the embodiment of the prefabricated elements 7 and 8 illustrated in FIG. 5 and adapted for a cylindrical well, the element 7 comprises a portion 7a forming the step proper and a peripheral portion 7b in the form of a portion of annular ring. The element 8 itself is in the form of a portion of annular ring, so that at each horizontal level of elements, the annular ring formed thereby comprises a plurality of elements 8 and a portion 7b. Of course, from one horizontal level of elements to the following, the portion 7b of an element 7 is offset angularly about the axis of the well so that portions 7a form a continuous spiral staircase.

The central newel 6 of the elements 7 may be pierced with a hole 6a, at right angles to the step 7a, adapted to serve for assembling said staircase, and form, by super- position, a passage for ventilating the bottom of the device.

As illustrated in FIGS. 1 to 5, the front and rear faces of the elements 8 may be flat or curved.

It is advantageous to dispose a stabiliser 9, for example sand, between the damp proof system and the bins 8.

The opening of the device according to the invention may be closed by a removable trap door. However, it is advantageous if at least half of this opening is closed permanently, only the access to the first steps being free. For example, in FIG. 6, a device according to the invention, cylindrical in form, has been illustrated in plan view, the circular opening of which in the flagstone 2 is permanently closed by a half-moon 10 forming part of said flagstone and by a removable semi-circular trap door 11, completing the half-moon 10.

Rather than close this access by a trap door, it may be preferable to provide an alcove or closet with the aid of partitions supported on the concrete layer, said access being arranged in the floor of said closet. For example, in the schematic example of FIG. 7, the opening of the device of the invention is half-closed by a half-moon 10, as in the example of FIG. 6, the other half of this opening, corresponding to the first steps, opening in a closet 12 defined by the partitions 13 and 14 are closed by a door 15. The partitions 13 and 14 may be specially constructed to form the closet 12. In the case shown in FIG. 8, the closet 12 has been formed by using two pre-existing walls 16 and 17 at an angle, completed by two angled partitions 18 and 19.

I claim:

1. A method for constructing a cellar or storage area underneath an already existing building the foundation of which comprises a concrete flooring on which the building rests on the ground comprising the steps of:
    making an opening through said concrete flooring to gain access to the earth below the building;
    excavating a well in the earth through said opening in the concrete flooring;
    introducing through said opening in said flooring a plurality of prefabricated storage bin elements which when assembled form an envelope comprising said storage area, and
    assembling said prefabricated elements within said well to form said envelope conforming to the shape of said well.

2. A method as claimed in claim 1, wherein said opening is circular.

3. A method as claimed in one of claims 1 or 2, wherein, before the prefabricated envelope is placed in position, a damp-proof system is disposed in said well to form a pocket insulated from the surrounding earth for containing said envelope.

4. A device in the construction of a cellar, or storage area, underneath an already existing building having a foundation comprising concrete flooring, on which the building rests on the ground and wherein an opening has been made in said concrete flooring and earth below said foundation has been excavated to form a well, comprising a plurality of similar prefabricated storage bin elements which can be introduced into the well through said opening and when assembled in super-posed and juxtaposed relationship comprise an envelope conforming to the interior of said well.

5. A device as claimed in claim 4, wherein the elements of the envelope are cellular bins disposed in stacked rows over at least a part of the height of the well.

6. A device for use with prefabricated elements as claimed in claim 5, comprising other prefabricated elements forming a member disposed at the centre of the envelope and allowing access to all the bins.

7. A device as claimed in claim 6, wherein said member giving access to the bins is a spiral staircase of which the vertical central newel is disposed along the vertical axis of the well.

8. A device as claimed in claim 6, wherein the elements forming bins are independent of the elements forming the member giving access.

9. A device as claimed in claim 6, wherein each element forming a member giving access is fast with at least one element forming a bin.

10. A device as claimed in claim 6, wherein each element forming a member giving access comprises a portion inserted between two elements forming a bin disposed in the same row.

11. A device as claimed in claim 4, in which the well is cylindrical in shape, particularly of circular section, wherein the rows of bins form a cylindrical envelope.

* * * * *